United States Patent
Khan

(10) Patent No.: US 12,552,720 B2
(45) Date of Patent: Feb. 17, 2026

(54) METHODS AND SYSTEMS FOR IN-PLANE SLURRY INFILTRATION OF COMPOSITE PREFORMS

(71) Applicant: GOODRICH CORPORATION, Charlotte, NC (US)

(72) Inventor: Atta Khan, Colorado Springs, CO (US)

(73) Assignee: GOODRICH CORPORTION, Charlotte, NC (US)

( * ) Notice: Subject to any disclaimer, the term of this patent is extended or adjusted under 35 U.S.C. 154(b) by 868 days.

(21) Appl. No.: 17/187,287

(22) Filed: Feb. 26, 2021

(65) Prior Publication Data

US 2021/0355038 A1 Nov. 18, 2021

Related U.S. Application Data

(60) Provisional application No. 63/023,355, filed on May 12, 2020.

(51) Int. Cl.
*C04B 35/628* (2006.01)
*B28B 1/52* (2006.01)
(Continued)

(52) U.S. Cl.
CPC .......... *C04B 35/62886* (2013.01); *B28B 1/52* (2013.01); *B28B 11/243* (2013.01);
(Continued)

(58) Field of Classification Search
CPC ........ C04B 35/62886; C04B 35/62855; C04B 35/62871; B82Y 30/00; F16D 69/023; C08L 83/16
See application file for complete search history.

(56) References Cited

U.S. PATENT DOCUMENTS 5,173,367 A * 12/1992 Liimatta ................. C08L 83/16
524/439
5,660,877 A 8/1997 Venkataramani et al.
(Continued)

FOREIGN PATENT DOCUMENTS

CN 109822778 5/2019
EP 3747850 12/2020
(Continued)

OTHER PUBLICATIONS

European Patent Office; Extended European Search Report dated Jan. 25, 2022 in Application No. 21173595.6.
(Continued)

*Primary Examiner* — Andrew J Bowman
(74) *Attorney, Agent, or Firm* — SNELL & WILMER L.L.P.

(57) ABSTRACT

Systems and methods for infiltrating a fibrous preform in the in-plane direction and forming composite components are provided. A system for infiltrating a fibrous preform may include a slurry reservoir defining a cavity configured to receive a fibrous preform. The cavity may be configured such that an internal surface of the slurry reservoir is spaced apart from an outer diameter of the fibrous preform. A slurry inlet may be formed in the slurry reservoir. The slurry inlet and the cavity may be configured such that a slurry input into the cavity infiltrates the fibrous preform in an in-plane direction.

12 Claims, 6 Drawing Sheets

(51) Int. Cl.
  *B28B 11/24* (2006.01)
  *C04B 35/52* (2006.01)
  *C04B 35/565* (2006.01)
  *C04B 35/626* (2006.01)
  *C04B 35/80* (2006.01)
  *F16D 65/12* (2006.01)

(52) U.S. Cl.
  CPC ............ *C04B 35/52* (2013.01); *C04B 35/565* (2013.01); *C04B 35/62625* (2013.01); *C04B 35/80* (2013.01); *C04B 2235/3821* (2013.01); *C04B 2235/5244* (2013.01); *C04B 2235/5248* (2013.01); *C04B 2235/5252* (2013.01); *C04B 2235/6022* (2013.01); *C04B 2235/616* (2013.01); *F16D 65/126* (2013.01)

(56) References Cited

U.S. PATENT DOCUMENTS

| | | | | |
|---|---|---|---|---|
| 5,840,221 | A * | 11/1998 | Lau | .................... C04B 35/62871 264/29.7 |
| 7,378,362 | B2 * | 5/2008 | Nixon | .................... F16D 69/023 501/95.2 |
| 10,239,795 | B2 | 3/2019 | Billotte Cabre et al. | |
| 10,279,549 | B2 | 5/2019 | Grove-Nielsen | |
| 10,370,301 | B2 | 8/2019 | Chamberlain et al. | |
| 2013/0106020 | A1 * | 5/2013 | Matthews | .............. B82Y 30/00 977/700 |
| 2016/0243798 | A1 | 8/2016 | Chai | |
| 2016/0281268 | A1 * | 9/2016 | Bruno | ............... C04B 35/62855 |
| 2017/0369382 | A1 | 12/2017 | Billotte Cabre et al. | |
| 2018/0045260 | A1 | 2/2018 | Perea | |

FOREIGN PATENT DOCUMENTS

| | | |
|---|---|---|
| WO | 2017107735 | 6/2017 |
| WO | 2019058054 | 3/2019 |

OTHER PUBLICATIONS

European Patent Office, European Partial Search Report dated Sep. 13, 2021 in Application No. 21173595.6.

Alessandro Scola et al: "New liquid processing of oxide/oxide 3D wowen ceramic matrix composites", Journal of the American Ceramic Society, Dec. 10, 2018 (Dec. 10, 2018), XP055533826, US ISSN: 0002-7820, DOI: 10.1111/jace.16235.

European Patent Office, European Search Report dated Jun. 16, 2023 in Application No. 23159415.1.

European Patent Office, European Office Action dated Apr. 17, 2025 in Application No. 21173595.6.

* cited by examiner

METHODS AND SYSTEMS FOR IN-PLANE SLURRY INFILTRATION OF COMPOSITE PREFORMS

CROSS-REFERENCE TO RELATED APPLICATIONS

This application claims priority to, and the benefit of, U.S. Provisional Application Ser. No. 63/023,355, filed May 12, 2020 and titled "METHODS AND SYSTEMS FOR IN-PLANE SLURRY INFILTRATION OF COMPOSITE PREFORMS," which is incorporated by reference herein in its entirety for all purposes.

FIELD

The present disclosure relates generally to composites and, more specifically, to systems and methods for in-plane slurry infiltration of composite preforms.

BACKGROUND

Aircraft typically utilize brake systems on wheels to slow or stop the aircraft during landings, taxiing and rejected takeoffs. The brake systems generally employ a brake stack or heat sink comprising a series of friction disks that may be forced into sliding contact with one another during brake actuation to slow or stop the aircraft. The brake stack typically comprises rotor disks and stator disks that, in response to axial compressive loads, convert the kinetic energy of the aircraft into heat through frictional forces experienced between the friction disks.

Carbon/carbon (C/C) composites and silicon carbide (SiC) based ceramic matrix composites (CMCs) have found use in the aerospace and other industries for fabricating brake stacks and heat sinks. The fibrous preforms used to form these composites may be infiltrated with a ceramic slurry. Infiltrating the fibrous preform through a thickness of the fibrous preforms (i.e., in the axial direction) tends to be difficult, as the porosity or open area within the preform is limited, thereby making it difficult for the slurry particles to penetrate the layers of the fibrous preform.

SUMMARY

A method of forming a composite component is disclosed herein. In accordance with various embodiments, the method may comprise locating a fibrous preform in a cavity of a slurry reservoir and inputting a slurry including a high specific heat particulate into the cavity. The cavity may be configured such that the slurry infiltrates the fibrous preform in an in-plane direction. The method may further comprise drying the fibrous preform and densifying the fibrous preform.

In various embodiments, the step of inputting the slurry into the cavity may comprise flowing the slurry about an outer diameter of the fibrous preform. In various embodiments, step of locating the fibrous preform in the cavity may comprise orienting the in-plane direction to be parallel with a vertical direction.

In various embodiments, the step of locating the fibrous preform in the cavity may comprise orienting the in-plane direction to be perpendicular with a vertical direction. In various embodiments, the step of flowing the slurry about the outer diameter of the fibrous preform may comprise flowing the slurry between the outer diameter of the fibrous preform and an internal surface of the slurry reservoir.

In various embodiments, the fibrous preform may comprise a plurality of textile layers, and the method may further comprise needling the plurality of textile layers.

In various embodiments, the method may further comprise generating a pressure gradient in the in-plane direction. In various embodiments, the high specific heat particulate may comprise boron carbide.

An infiltration system is also disclosed herein. In accordance with various embodiments, the infiltration system may comprise a slurry reservoir defining a cavity configured to receive a fibrous preform, and a slurry inlet formed in the slurry reservoir.

In various embodiments, the slurry reservoir may be configured to orient the fibrous preform such that the in-plane direction is oriented in a vertical direction. In various embodiments, a height of the cavity may be selected such that outer diameter of the fibrous preform is spaced apart from an internal surface of the slurry reservoir. In various embodiments, the internal surface of the cavity may be configured to contact a face of the fibrous preform.

In various embodiments, the slurry reservoir may be configured to orient the fibrous preform such that the in-plane direction is perpendicular to a vertical direction. In various embodiments, the cavity may be configured such that an internal surface of the slurry reservoir is spaced apart from an outer diameter of the fibrous preform.

A method of forming a brake disk is also disclosed herein. In accordance with various embodiments, the method may comprise locating a fibrous preform in a cavity of a slurry reservoir, infiltrating the fibrous preform in an in-plane direction with a slurry, and densifying the fibrous preform after infiltrating the fibrous preform. The slurry may include a high specific heat particulate.

In various embodiments, the step of infiltrating the fibrous preform may comprise flowing the slurry about an outer diameter of the fibrous preform. In various embodiments, the step of locating the fibrous preform in the cavity may comprise orienting the in-plane direction to be parallel with a vertical direction.

In various embodiments, the step of locating the fibrous preform in the cavity may comprise orienting the in-plane direction to be perpendicular with a vertical direction, and the step of flowing the slurry about the outer diameter of the fibrous preform may comprise flowing the slurry between the outer diameter of the fibrous preform and an internal surface of the slurry reservoir.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of embodiments herein makes reference to the accompanying drawings, which show embodiments by way of illustration. While these embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not for limitation. For example, any reference to singular includes plural embodiments, and any reference to more than one component or step may include a singular embodiment or step. Also, any reference to attached, fixed, connected or the like may include permanent, removable, temporary, partial, full and/or any other possible attachment option.

Provided herein, according to various embodiments, are manufacturing system(s) and method(s) for infiltrating ceramic into preforms used for fabrication of composite components. While numerous details are included herein pertaining to aircraft components, such as brake components, the manufacturing system(s) and method(s) disclosed herein can be applied to fabricate other composite components.

Figure 1A:
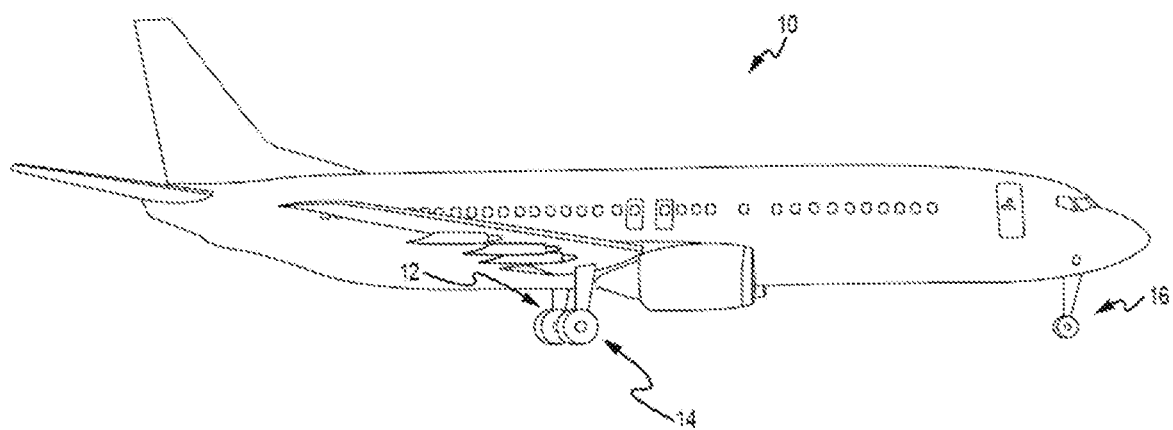
FIG. 1A illustrates an exemplary aircraft having a brake system, in accordance with various embodiments.

Referring to FIG. 1A, in accordance with various embodiments, an aircraft 10 is illustrated. The aircraft 10 includes landing gear, which may include a left main landing gear 12, a right main landing gear 14, and a nose landing gear 16. The landing gear support the aircraft 10 when it is not flying, allowing the aircraft 10 to taxi, take off, and land without damage. While the disclosure refers to the three landing gear configurations just described, the disclosure nevertheless contemplates any number of landing gear configurations.

Figure 1B:
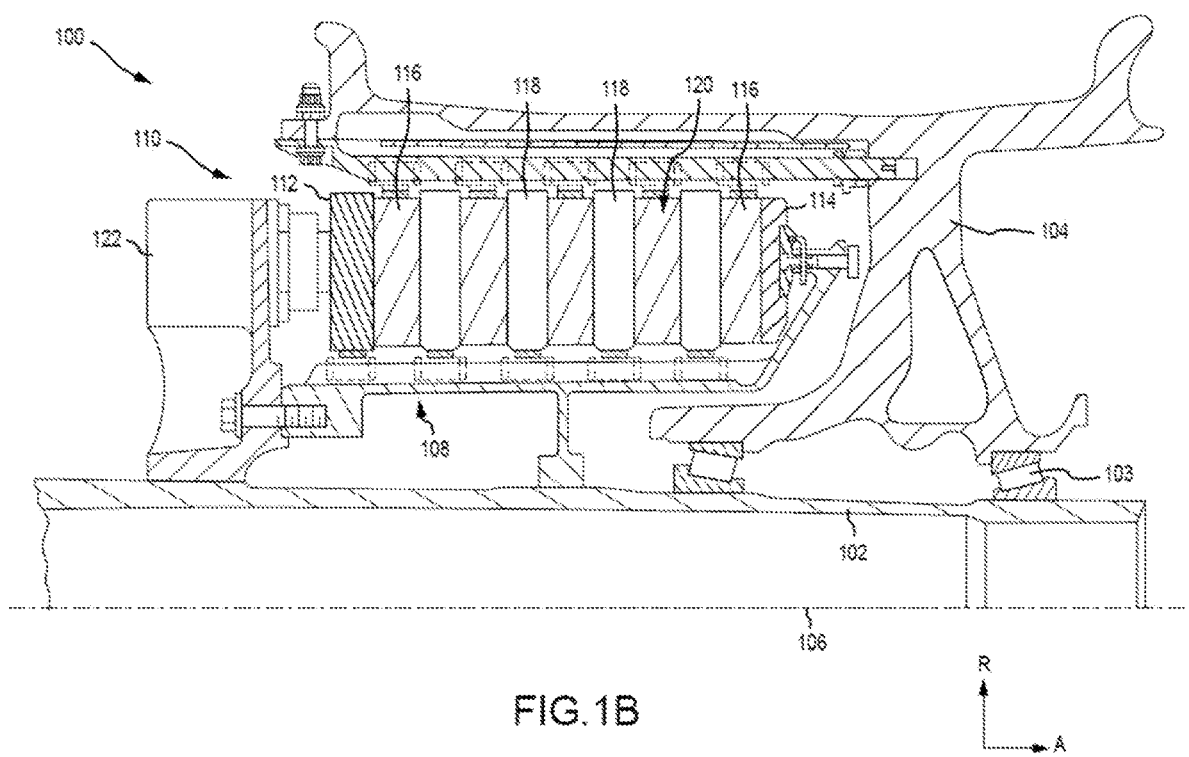
FIG. 1B illustrates a cross-sectional view of a brake assembly, in accordance with various embodiments.

Referring now to FIG. 1B, there is schematically depicted a brake mechanism 100 configured for use on a landing gear, such as, for example, each of the left main landing gear 12 and the right main landing gear 14 described above with reference to FIG. 1A. In various embodiments, the brake mechanism 100 is mounted on an axle 102 for use with a wheel 104 disposed on and configured to rotate about the axle 102 via one or more bearing assemblies 103. A central axis 106 extends through the axle 102 and defines a center of rotation of the wheel 104. As used herein, the term "radial" refers to directions perpendicular to a central axis 106 of fibrous preform, the term "axial" refers to direction parallel to central axis 106, and the term "circumferential" reference to directions about central axis 106. A torque plate barrel 108 (sometimes referred to as a torque tube or a torque plate) is aligned concentrically with the central axis 106, and the wheel 104 is rotatable relative to the torque plate barrel 108.

The brake mechanism 100 includes a piston assembly 110, a pressure plate 112 disposed adjacent the piston assembly 110, an end plate 114 positioned a distal location from the piston assembly 110, and a plurality of rotor disks 116 interleaved with a plurality of stator disks 118 positioned intermediate the pressure plate 112 and the end plate 114. The pressure plate 112, the plurality of rotor disks 116, the plurality of stator disks 118, and the end plate 114 together form a brake heat sink or brake stack 120. The pressure plate 112, the end plate 114, and the plurality of stator disks 118 are mounted to the torque plate barrel 108 and remain rotationally stationary relative to the axle 102. The plurality of rotor disks 116 is mounted to the wheel 104 and rotate with respect to each of the pressure plate 112, the end plate 114, and the plurality of stator disks 118.

An actuating mechanism for the brake mechanism 100 includes a plurality of piston assemblies, including the piston assembly 110, circumferentially spaced around a piston housing 122 (only one piston assembly is illustrated in FIG. 1B). Upon actuation, the plurality of piston assemblies affects a braking action by urging the pressure plate 112 and the plurality of stator disks 118 into frictional engagement with the plurality of rotor disks 116 and against the end plate 114. Through compression of the plurality of rotor disks 116 and the plurality of stator disks 118 between the pressure plate 112 and the end plate 114, the resulting frictional contact slows or stops or otherwise prevents rotation of the wheel 104. In various embodiments, the brake disks of brake mechanism 100 (e.g., rotor disks 116 and the stator disks 118) are fabricated from various composite materials, such as, for example, carbon/carbon (C/C) composite or ceramic matrix composite (CMCs), that enable the brake disks to withstand and dissipate the heat generated during and following a braking action.

In accordance with various embodiments, rotor disks 116 and/or stator disks 118 are each comprised of a carbon-carbon (C/C) material having a high specific heat particulate interspersed throughout the rotor disks 116 and/or stator disks 118, where high specific heat particulate includes any particulate or powder (typically ceramic) that raises the specific heat of the disk above that of C/C composite alone. For example, in various embodiments, the rotor disks 116 and/or stator disks 118 may comprise a C/C composite that includes a percentage of boron, a boron component, or other material having a high specific heat (i.e., a specific heat greater than the specific heat of the C/C composite alone). In various embodiments, rotor disks 116 and/or stator disks 118 may comprise a C/C composite with a percentage of boron carbide ($B_4C$) disposed substantially throughout the disk.

In various embodiments, the process of interspersing the boron carbide (or other high specific heat component) into the C/C composite is performed by a slurry infiltration process. As described in further detail below, the slurry may infiltrate a fiber preform employed to form the C/C composite in the radial, or in-plane, direction. Infiltrating in the radial, as opposed to the axial, direction tends to allow greater volumes and/or larger size particles to be infiltrated. Increasing the volume and/or size of the particles may facilitate the densification process by increasing the surface area available for the matrix material to bond to and by decreasing the open, or empty, volume within the preform. In-plane infiltration may also allow thicker fibrous preforms (e.g., fibrous preforms including a greater number of fiber layers) to be used in the manufacture rotor disks 116 and/or stator disks 118, as the compared to axial infiltration.

Figure 2:
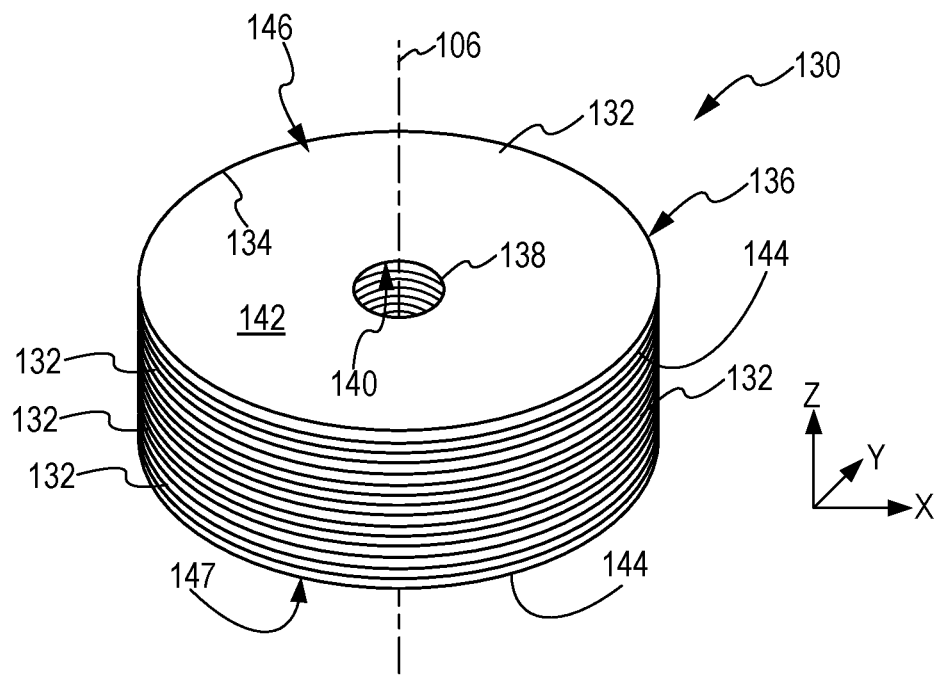
FIG. 2 illustrates a fibrous preform, in accordance with various embodiments.

Referring now to FIG. 2, a fibrous preform 130 is illustrated, in accordance with various embodiments. Fibrous preform 130 may be employed to form a rotor disk 116 or a stator disks 118, as described above. Fibrous preform 130 may comprise a porous structure comprised of a plurality of stacked textile layers 132. Each textile layer 132 having a thickness in a first dimension (i.e., the Z-direction) that may be substantially less than a thickness of the layer 132 in the other two dimensions (i.e., the X-direction and the Y-direction). As used herein, the "in-plane" direction refers to directions parallel to the thicker two dimensions (i.e., parallel to the X and Y directions and perpendicular to the Z-direction).

A porous structure may comprise any structure derived from a fibrous material such as carbon fibers or the like. In various embodiments, the carbon fibers may be derived from polyacrylonitrile (PAN), rayon (synthetic fiber derived from cellulose), oxidized polyacrylonitrile fiber (OPF), pitch, or the like. The starting fiber may be pre-oxidized PAN or fully carbonized commercial carbon fiber. Fibrous preform 130 may be prepared by needling the textile layers 132 of fibrous preform 130. Needling the textile layers 132 of fibrous preform 130 tends to push fibers from one layer 132 to the next layer 132, thereby forming z-fibers that extend axially across the layers 132. Needling pulls fibers from the in-plane direction and forces them into the z-fiber direction. After needling, fibrous preform 130 may comprise fibers extending in three different directions: the radial direction, the circumferential direction, and the axial direction (or the X, Y, and Z directions).

Fibrous preform 130 may be fabricated using a net shape preforming technology or may be cut from a needled board. Fibrous preform 130 may be a lay-up of woven, braided or knitted textile layers 132. The fibrous material may be in the form of chopped carbon fibers molded to form layers 132. Prior to the densification process, the fibrous material may be formed into a preform having any desired shape or form. For example, the fibrous preform may be in the form of a disk having any shape such as, for example, a polygon, a cylinder, a triangle, annular, square, rectangle, pentagon, hexagon, octagon, or the like. In various embodiments, layers 132 and fibrous preform 130 may have a generally annular shape. In accordance with various embodiments, the outer circumferential (or outer perimeter) surfaces 134 of layers 132 may form an outer diameter (OD) 136 of fibrous preform 130, and the inner circumferential (or inner perimeter) surfaces 138 of layers 132 may form an inner diameter (ID) 140 of fibrous preform 130. Each layer 132 includes a first axial face 142 and a second axial face 144 opposite the first axial face 142. First and second axial faces 142, 144 extend from outer circumferential surface 134 to inner circumferential surface 138. Layers 132 are stacked such that the first axial face 142 of one layer 132 is oriented toward the second axial face 144 of the adjacent layer 132. First axial face 142 of the uppermost layer 132 forms the upper axial end 146 of fibrous preform 130 and the second axial face 144 of the bottommost layer 132 forms the lower axial end 147 of fibrous preform 130 (i.e., the two layers 132 that are farther apart from one another in the axial direction form the axial ends 146, 147 of the fibrous preform).

Figure 3:
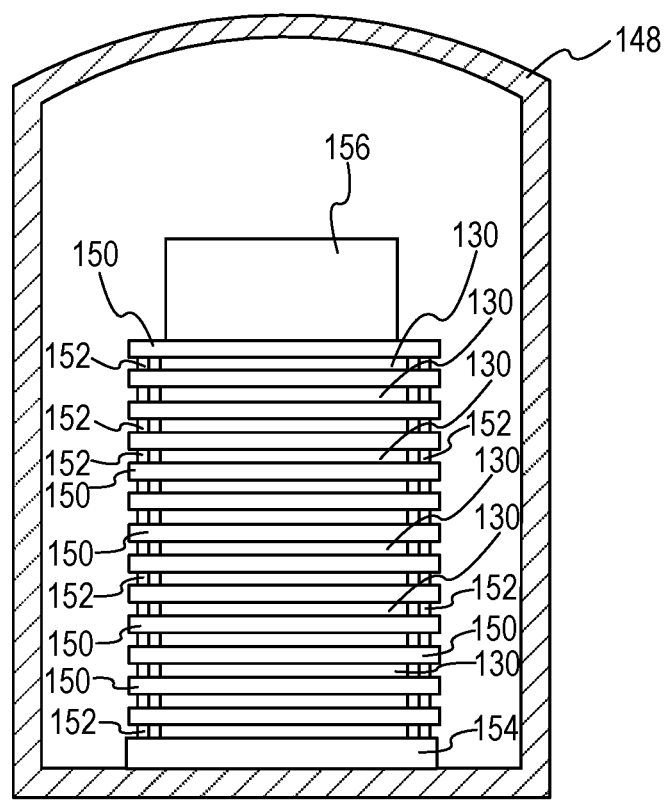
FIG. 3 illustrates a fibrous preform in a carbonization furnace, in accordance with various embodiments.

As shown in FIG. 3, fibrous preforms 130 may be placed in a furnace 148 for carbonization. The carbonization process may be employed to convert the fibers of the fibrous preforms 130 into pure carbon fibers, as used herein only "pure carbon fibers" means carbon fibers comprised of at least 99% carbon. The carbonization process is distinguished from the densification process described below in that the densification process involves infiltrating the pores of the fibrous preform 130 and depositing a matrix (e.g., carbon, phenolic resin, or any other desired matrix material) within and around the carbon fibers of the fibrous preform, and the carbonization process refers to the process of converting the fibers of the fibrous preform 130 into pure carbon fibers.

In various embodiments, a plurality of fibrous preforms 130 may be placed on top of one another with separator plates 150 and spacing stops 152 disposed between adjacent fibrous preforms 130. For example, the bottommost fibrous preform 130 may be placed on a base plate 154 at the bottom of carbonization furnace 148. A separator plate 150 may be placed on top of the bottommost fibrous preform 130. Another fibrous preform 130 may then be placed on the separator plate 150, and another separator plate 150 may be placed on that fibrous preform 130. A stack of fibrous preforms 130 and separator plates 150 may be constructed in this manner, with each fibrous preform 130 being separated from superjacent and subjacent fibrous preforms 130 by separator plates 150. Stops 152 may be placed between each of the separator plates 150. The stops 152 may comprise a height that is less than the thickness of the fibrous preform 130 prior to carbonization. Stops 152 may define a target thickness of the fibrous preform 130 after carbonization. In that regard, after the stack of fibrous preforms 130 is constructed, and before the carbonization process has started, gaps may exist between the stops 152 and adjacent separator plates 150. During carbonization, a compressive load may be applied to the fibrous preforms 130, thereby compressing fibrous preforms 130 until stops 152 contact adjacent separator plates 150.

In various embodiments, compressive pressure may be applied to fibrous preforms 130 during the carbonization. The compressive pressure may be applied by placing a weight 156 over fibrous preforms 130, or by applying a compressive load to the fibrous preforms 130 by other suitable means. The compressive pressure may be applied along the direction of the z-fibers. It will be appreciated by those skilled in the art that the mass of weight 156 and/or the compressive force generated by weight 156 may vary depending on the size of fibrous preforms 130, the pre-carbonization fiber volume of fibrous preforms 130, the desired post-carbonization fiber volume of fibrous preforms 130, and/or the number fibrous preforms 130 being compressed. As used herein, "fiber volume" refers the percentage of the total volume of the fibrous preform that is formed by the fibers of the fibrous preform. For example, a fiber volume of 18% means the fibers of the fibrous preform form 18% of the total volume of fibrous preform. In various embodiments, after carbonization, fibrous preform 130 comprises a fiber volume of between 10% and 50%. In various embodiments, after carbonization, fibrous preform 130 comprises a fiber volume of between 15% and 25%. In various embodiments, fibrous preforms 130 having a low fiber volume may be desirable for the infiltration methods disclosed herein. In various embodiments, after carbonization, fibrous preform 130 may comprise a fiber volume of less than 25%. For example, in various embodiments, after carbonization, fibrous preform 130 may comprise a fiber volume of 21% or, in various embodiments, fibrous preform 130 may comprise a fiber volume of 18%.

After carbonization, fibrous preform 130, may be densified using, for example, CVI. In various embodiments, prior to densification, fibrous preform 130 is infiltrated with a slurry including a high specific heat particulate. For example, in various embodiments, fibrous preform 130 is infiltrated with a ceramic slurry (i.e., a slurry comprised of a liquid carrier and ceramic particulates).

Figure 4A:
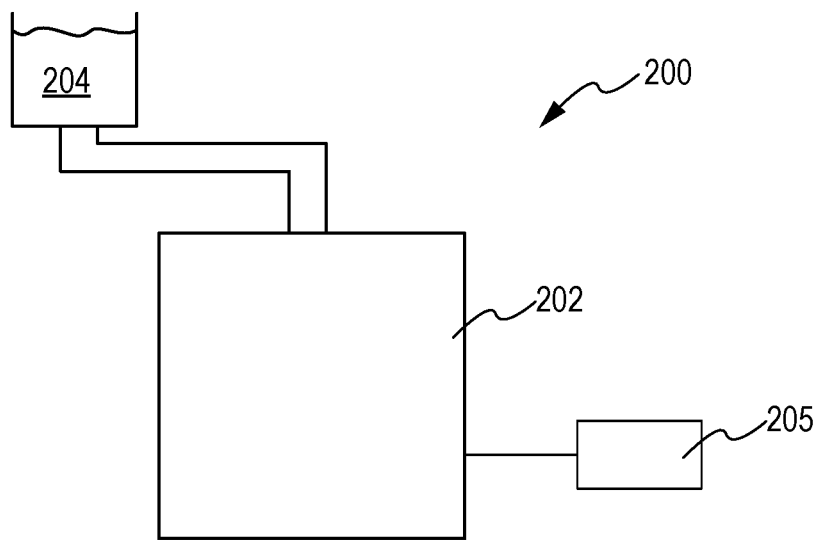
FIG. 4A illustrates an infiltration system, in accordance with various embodiments.

With additional reference to FIG. 4A, an exemplary infiltration system 200 is shown. In accordance with various embodiments, infiltration system 200 may include a slurry reservoir 202 in which fibrous preforms 130 may be located. In various embodiments, the slurry infiltration process comprises preparation of a slurry 204 including a ceramic particulate (e.g., an aqueous $B_4C$-based slurry) and immersing the carbonized fibrous preform 130 into the slurry 204 for a period of time sufficient for the particulate (e.g., the $B_4C$) to infiltrate the fibrous preform 130. Slurry 204 is input into slurry reservoir 202. In various embodiments, slurry 204 may be input into slurry reservoir 202 at atmospheric pressure. In various embodiments, infiltration system 200 may include a vacuum pump 205 configured to evacuate slurry reservoir 202 prior to inputting slurry 204. Stated differently, slurry reservoir 202 may be at a vacuum pressure when slurry 204 is input. In various embodiments, after evacuation of slurry reservoir 202 (i.e., in response generating a vacuum pressure within slurry reservoir 202), vacuum pump 205 may be turned off and slurry 204 is input into slurry reservoir 202. In various embodiments, vacuum pump 205 may remain on during infiltration.

Slurry 204 may include high specific heat particulate and a liquid carrier (such as, for example, water and/or alcohol). In various embodiments, slurry 204 may further include a high specific heat particulate, a binder (e.g., a polymeric adhesive or polyvinyl acetate), and a liquid carrier (e.g., water). It will be appreciated by those skilled in the art that liquid carriers other than water may be used and that the type and/or volume of liquid carrier and/or of binder may be selected based on the composition of the high specific heat particulate. In various embodiments, slurry 204 may be a $B_4C$-based slurry and may be prepared by mixing $B_4C$ powder in water with appropriate additives, such as wetting agents and dispersants. The $B_4C$ powder may comprise particulates having an average particle sizes from submicron up to about 30 microns. As used in the previous context only, "about" means±5 microns. In accordance with various embodiments, fibrous preforms 130 are loaded into slurry reservoir 202 and the slurry 204 is input into slurry reservoir 202 and allowed to infiltrate into and disperse throughout the fibrous preforms 130.

Figure 4B:
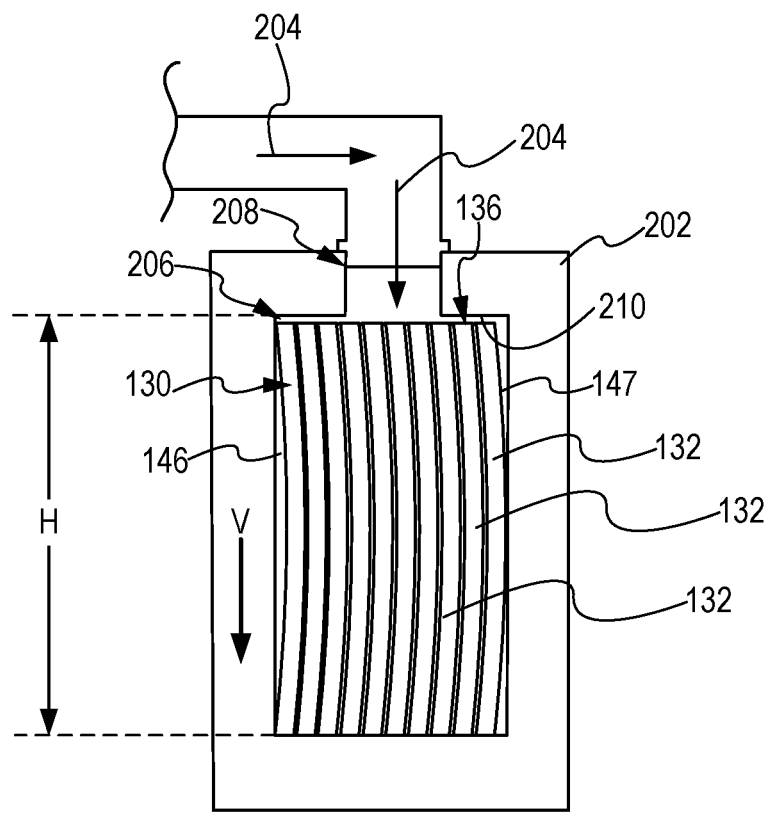
FIG. 4B illustrates a fibrous preform located in the slurry reservoir of an infiltration system and oriented vertically, in accordance with various embodiments.

With reference to FIG. 4B, additional details of infiltration system 200 are shown. In accordance with various embodiments, slurry reservoir 202 may define a cavity 206 configured to receive fibrous preform 130. While FIG. 4B illustrates one (1) fibrous preform 130 located in cavity 206, it is contemplated and understood that multiple fibrous preforms 130 may be located in cavity 206. In various embodiments, slurry 204 is input into cavity 206 through an inlet 208 of slurry reservoir 202. In accordance with various embodiments, cavity 206 and inlet 208 are configured such that slurry 204 will flow through fibrous preform 130 in an in-plane direction.

In accordance with various embodiments, fibrous preform 130 may be located in cavity 206 such that the in-plane (or radial) direction is oriented in the vertical direction (i.e., in the direction of arrow V). As used herein, the vertical direction refers to the direction of gravity. Orienting the fibrous preform 130 with the in-plane direction oriented vertically allows gravity, along with the capillary action, to cause slurry 204 to flow substantially in the in-plane direction. It will be appreciated by those skilled in the art that the capillary action may also cause a small portion of slurry 204 to flow in the axial direction. However, the majority of the slurry 204 will flow in the in-plane direction, as the porosity, or spacing, between the axial faces of adjacent layers 132 of fibrous preform 130 is generally larger than the than porosity, or spacing, between the fibers forming the axial faces of each layer 132. In this regard, slurry 204 more flow more easily in the in-plane (or radial) direction, as compared to the axial direction. The larger porosity in the in-plane direction (i.e., between layer 132) allows slurry 204 to infiltrate fibrous preform 130. In various embodiments, infiltration may be performed without employing a pump and/or vacuum to flow slurry 204 through fibrous preform 130.

In accordance with various embodiments, an internal surface 210 of slurry reservoir 202 may be spaced apart from, at least a portion of, the OD 136 of fibrous preform 130. Internal surface 210 may define cavity 206. Spacing internal surface 210 apart from OD 136 tends to allow slurry 204 to flow along OD 136. Stated differently, a height H of cavity 206 may be selected to allow slurry 204 to flow between internal surface 210 and OD 136. In various embodiments, upper axial end 146 and/or lower axial end 147 of fibrous preform may contact internal surface 210 of slurry reservoir 202. The contact may prevent or reduce slurry 204 from flowing between upper axial end 146 and internal surface 210 and between lower axial end 147 and internal surface 210.

In various embodiments, following infiltration, the fibrous preform 130 is dried. In various embodiments, following infiltration, the fibrous preform 130 is dried while located in slurry reservoir 202. In various embodiments, following infiltration, the fibrous preform 130 is removed from slurry reservoir 202 and dried in a separate oven. Stated differently, in various embodiments, a heat treatment may be performed, following infiltration, to remove the liquid carrier of the slurry 204 from the fibrous preform 130. In various embodiments, the heat treatment may include heating fibrous preform 130 at temperatures of between 100° F. and 205° F. (38° C. and 96° C.). In various embodiments, the fibrous preform 130 may be air-dried or dried at room temperature (e.g., at a temperature between 65° F. and 85° F. (18° C. and 29° C.)). After drying, the fibrous preform 130 is densified (e.g., by a chemical vapor infiltration (CVI) process) to form a matrix around the fibers of fibrous preform 130.

Infiltrating fibrous preform 130 in the in-plane, as opposed to the axial, direction tends to allow greater volumes and/or larger size particles to be infiltrated. Larger particles have less surface area, as compared to the same volume of smaller particles. The decreased surface area is less conducive to rapid densification and allows gas to penetrate deeper in the preform, as compared to quickly densifying close to the outer surfaces. Densifying deeper in the fibrous preform, as opposed to densifying from the outer surfaces, can reduce occurrences of the outer surfaces of the preform sealing before the inner volume is sufficiently densified. Reducing a probability of the outer surfaces sealing before the inner volume is sufficiently densified, tends to decrease densification time and/or may reduce the number of densification cycles and/or may allow for the densification of thicker fibrous preforms.

Figure 5A:
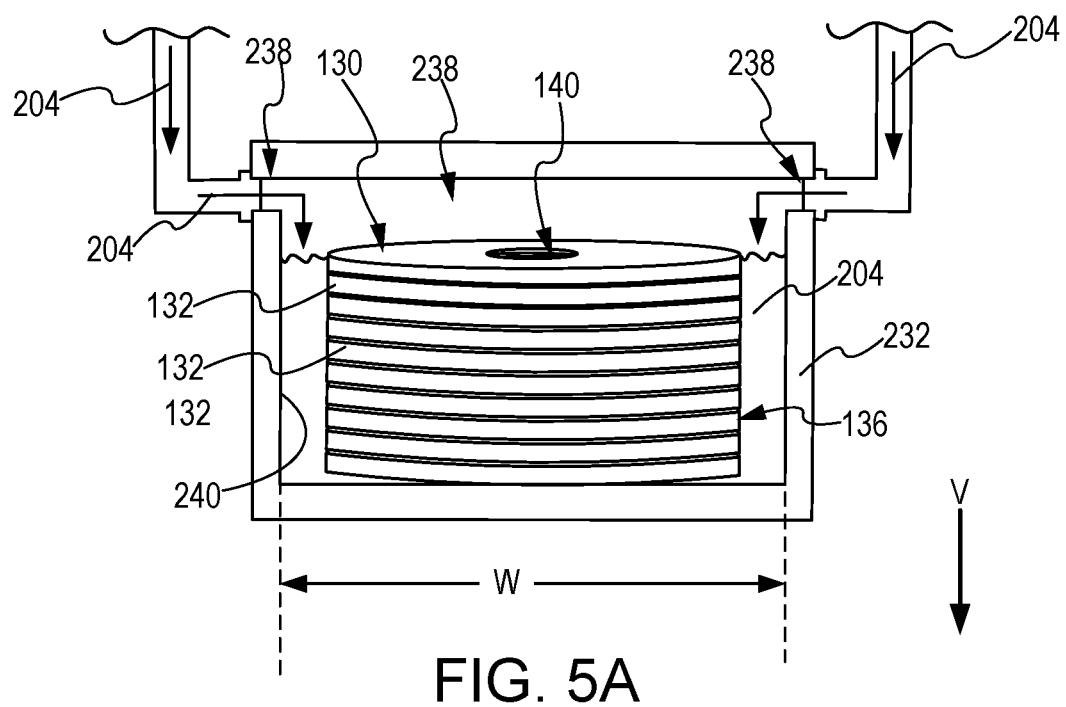
FIG. 5A illustrates a fibrous preform located in the slurry reservoir of an infiltration system and oriented horizontally, in accordance with various embodiments.
Figure 5B:
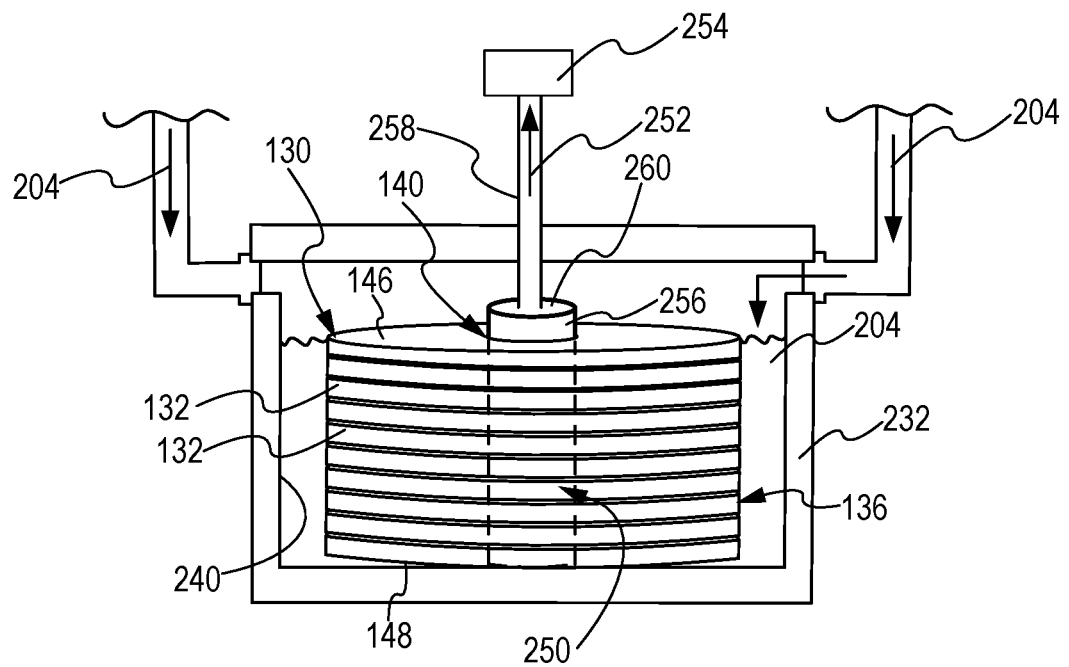
FIG. 5B illustrates a filter located at an inner circumferential surface of a fibrous preform located within the slurry reservoir of an infiltration system, in accordance with various embodiments.

With reference to FIG. 5A, a slurry reservoir 232 is illustrated. In various embodiments, infiltration system 200 may include one or more slurry reservoir(s) 232 in place of or in addition to slurry reservoir 202. Fibrous preforms 130 may be located in a cavity 236 of slurry reservoir 232. While FIGS. 5A and 5B illustrate one (1) fibrous preform 130 located in cavity 236, it is contemplated and understood that multiple fibrous preforms 130 may located in cavity 236. In various embodiments, vacuum pump 205 may evacuate cavity 236, prior to slurry 204 being input into cavity 236, such that the infiltration of fibrous preform 130 occurs under vacuum. In various embodiments, the pressure within cavity 236 may be equal to the atmospheric pressure, such that the infiltration of fibrous preform 130 occurs at atmospheric pressure. In various embodiments, slurry 204 is input into cavity 236 through one or more inlet(s) 238 of slurry reservoir 232. In accordance with various embodiments, cavity 236 and inlet(s) 238 are configured such that slurry 204 will flow through fibrous preform 130 in an in-plane direction.

In accordance with various embodiments, fibrous preform 130 may be located horizontally in cavity 206, such that the in-plane (or radial) direction is oriented perpendicular to the vertical direction (i.e., perpendicular to arrow V). In accordance with various embodiments, an internal surface 240 of slurry reservoir 232 may be spaced apart from, at least a portion of, the OD 136 of fibrous preform 130. Internal surface 210 may define cavity 206. Spacing internal surface 240 apart from OD 136 tends to allow slurry 204 to flow around the OD 136. In this regard, a width, or diameter, W of cavity 226 is greater than the width of fibrous preform 130, as measured at OD 136. Stated differently, the width, or diameter, W of cavity 226 may be selected to allow slurry 204 to flow between internal surface 240 and OD 136.

After inputting slurry 204, capillary action tends to draw slurry 204 from the OD 136 to the ID 140. Stated differently, capillary action causes slurry 204 to flow through fibrous preform 130 substantially in the in-plane direction. It will be appreciated by those skilled in the art that the capillary action may also cause a portion of slurry 204 to flow in the axial direction. However, the majority of the slurry 204 will flow in the in-plane direction, as the porosity, or spacing, between the axial faces of adjacent layers 132 of fibrous preform 130 is generally larger than the than porosity, or spacing, between the fibers forming the axial faces of each layer 132. In this regard, slurry 204 flows more easily in the in-plane (or radial) direction, as compared to the axial direction. The larger porosity in the in-plane direction (i.e., between layer 132) allows slurry 204 to infiltrate fibrous preform 130. In various embodiments, infiltration may be performed without employing a pump to flow slurry 204 through fibrous preform 130. In various embodiments, slurry 204 may be input into the ID 140 of fibrous preform 130 with capillary action causing slurry 204 to flow in an in-plane direction from ID 138 toward OD 136.

With reference to FIG. 5B, in various embodiments, a filter 250 may be located along the ID 140 of fibrous preform 130. Filter 250 may be configured to separate the high specific heat particulate from the liquid carrier 252 of slurry 204. In this regard, filter 250 is permeable to the liquid carrier 252 of slurry 204 and impermeable to the high specific heat particulate of slurry 204. Filter 250 may be coupled to a pump 254. Pump 254 may generate a pressure gradient between the OD 136 and ID 140 of fibrous preform 130. The pressure gradient is configured to cause slurry 204 to flow in the in-plane direction through fibrous preform 130 and into an interior of filter 250. In this regard, pump 254 may cause slurry 204 to flow from OD 136, through ID 140 and filter 250, and into the interior of filter 250.

In accordance with various embodiments, an exterior surface 256 (i.e., an outer circumferential surface) of filter 250 is oriented toward ID 140 and an interior surface (i.e., an inner circumferential surface) of filter 250 is oriented away from ID 140 and toward the interior of filter 250. As slurry 204 flows from the exterior surface 256 of filter 250 to the interior surface of filter 250, the high specific heat particulate of slurry 204 is separated from the liquid carrier 252 of slurry 204. In this regard, the high specific heat particulate is caught and/or remains in the filter 250 and fibrous preform 130, while the liquid carrier 252 flows into the interior of filter 250 and out slurry reservoir 232 via conduit 258 fluidly coupled to filter 250 and pump 254. In various embodiments, the axial faces 260 of filter 250 and any portions of the exterior surface of filter 250 that are located outside of fibrous preform 130 (i.e., which are not located radially between the upper axial end 146 and the lower axial end 147 of fibrous preform 130) may be impermeable to fluid, thereby generally ensuring and/or increasing the probability that slurry 204 will flow through fibrous preform 130 prior to reaching filter 250.

While FIG. 5B illustrates filter 250 located radially inward of ID 140, it will be appreciated by those skilled in the art that filter 250 could also be located radially outward of OD 136 and slurry 204 may be input at ID 138. In this regard, pump 254 and filter 250 may be configured to generate a pressure gradient which causes slurry 204 to flow in the in-plane direction from ID 140, to OD 136, and through filter 250. Additionally, it is further contemplated and understood that in various embodiments, filter 250 and pump 254 may be employed with fibrous preform 130 oriented vertically in slurry reservoir 202, as shown in FIG. 4B.

Figures 6, 7:
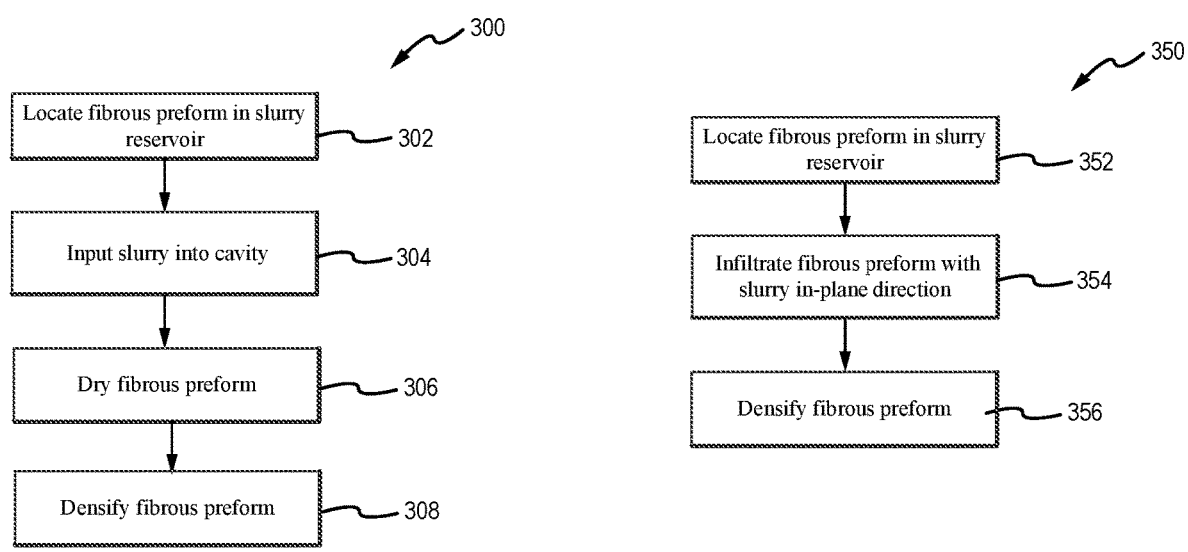
FIG. 6 illustrates a method of forming a composite component, in accordance with various embodiments.
FIG. 7 illustrates a method of forming a brake disk, in accordance with various embodiments.

With reference to FIG. 6, a method 300 of forming a composite component is illustrated. In accordance with various embodiments, method 300 may include locating a fibrous preform in a cavity of a slurry reservoir (step 302) and inputting a slurry including a high specific heat particulate into the cavity (step 304). In various embodiments, the cavity is configured such that the slurry infiltrates the fibrous preform in an in-plane direction. In various embodiments, method 300 may further include drying the fibrous preform (step 306) and densifying the fibrous preform (step 308). In various embodiments, step 308 is performed after steps 304 and 306.

In various embodiments, step 302 may include orienting the in-plane direction to be parallel with a vertical direction. In various embodiments, step 302 may include orienting the in-plane direction to be perpendicular with a vertical direction. In various embodiments, step 304 may include flowing the slurry about an outer diameter of the fibrous preform. In various embodiments, step 304 may include flowing the slurry between the outer diameter of fibrous preform and an internal surface of the slurry reservoir. In various embodiments, step 304 may include generating a pressure gradient in the in-plane. In various embodiments, method 300 may include locating a filter radially inward of an inner diameter of the fibrous preform. In various embodiments, method 300 may include needling the textile layers of the fibrous preform. In various embodiments, method 300 may include carbonizing the fibrous preform prior to step 302. In various embodiments, the high specific heat particulate comprises boron carbide.

With reference to FIG. 7, a method 350 of forming a brake disk is illustrated. In accordance with various embodiments, method 350 may include locating a fibrous preform in a cavity of a slurry reservoir (step 352) and infiltrating the fibrous preform in an in-plane direction with a slurry (step 354). In various embodiments, the slurry may include a high specific heat particulate. In various embodiments, method 350 may further include densifying the fibrous preform (step 356). Step 356 is performed after step 356.

In various embodiments, step 352 comprises orienting the in-plane direction to be parallel with a vertical direction. In various embodiments, step 354 comprises flowing the slurry about an outer diameter of the fibrous preform. In various embodiments, step 352 comprises orienting the in-plane direction to be perpendicular with a vertical direction, and step 354 comprises flowing the slurry between the outer diameter of fibrous preform and an internal surface of the slurry reservoir. In various embodiments, method 350 may include locating a filter either radially inward of an inner diameter of the fibrous preform or radially outward of the outer diameter of the fibrous preform (e.g., between the outer diameter of the fibrous preform and the internal surface of the slurry reservoir.

Example 1

A carbonized fibrous preform comprising 18% fiber volume was placed in a slurry reservoir with the in-plane direction oriented perpendicular to vertical, similar to fibrous preform 130 in FIG. 5A. The slurry reservoir was evacuated by a vacuum pump to create vacuum pressure within the slurry reservoir. The vacuum pump was then turned off and a slurry comprising 20% $B_4C$, having an average particle size of 3.8 microns, and 80% water was input into the slurry reservoir between an outer diameter of the fibrous preform and an interior surface of the slurry reservoir. The volume of the slurry was selected such that the slurry would flow 360° about the OD of the fibrous preform and extend from the upper axial end of the fibrous preform to the lower axial end of the fibrous preform. After approximately 10 minutes (±5 minutes) the fibrous preform was removed from the slurry reservoir and dried at a temperature of 190° F. (87.8° C.) for four hours. The infiltration and drying steps, as just described, were repeated four (4) times (i.e., a total of five (5) slurry infiltrations and five (5) dryings were performed). The resulting infiltrated fibrous preform had 26% by volume $B_4C$ particulate with an average particle size of 3.8.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of forming a composite component, comprising:
    locating a fibrous preform in a cavity of a slurry reservoir, wherein an outer diameter surface of the fibrous preform is spaced apart from an internal surface of the slurry reservoir, wherein the locating the fibrous preform in the cavity comprises orienting a radial direction of the fibrous preform to be parallel with a vertical direction of the cavity;
    after locating the fibrous preform in the cavity of the slurry reservoir, generating a vacuum pressure within the cavity of the slurry reservoir;
    after generating the vacuum pressure within the cavity of the slurry reservoir, inputting a slurry including particulates, a liquid carrier, and a binder, into the cavity at atmospheric pressure, wherein the cavity is configured such that the slurry infiltrates the fibrous preform in the radial direction, wherein the particulates are boron carbide ($B_4C$) particulates, wherein the liquid carrier is at least one of water or alcohol, and wherein the binder is at least one a polymeric adhesive or a polyvinyl acetate;
    generating a pressure gradient, via a pump, causing the slurry to flow in an in-plane direction through the fibrous preform from an outside diameter of the fibrous preform through and an inside diameter of the fibrous preform and into an interior of a filter coupled to the pump and located along the inside diameter of the fibrous preform;
    drying the fibrous preform; and
    densifying the fibrous preform.

2. The method of claim 1, wherein the inputting the slurry into the cavity comprises flowing the slurry about the outer diameter of the fibrous preform.

3. The method of claim 2, wherein the flowing the slurry about the outer diameter of the fibrous preform comprises flowing the slurry between the outer diameter of the fibrous preform and the internal surface of the slurry reservoir.

4. The method of claim 2, wherein the fibrous preform comprises a plurality of textile layers, and wherein the method further comprises needling the plurality of textile layers.

5. A method of forming a brake disk, comprising:
locating a fibrous preform in a cavity of a slurry reservoir;
after locating the fibrous preform in the cavity of the slurry reservoir, generating a vacuum pressure within the cavity of the slurry reservoir;
after generating the vacuum pressure within the cavity of the slurry reservoir, infiltrating the fibrous preform in a radial direction with a slurry at atmospheric pressure by flowing the slurry about an outer diameter of the fibrous preform, wherein the slurry includes particulates, a liquid carrier, and a binder, wherein the slurry infiltrates the fibrous preform at the atmospheric pressure, wherein the particulates are boron carbide ($B_4C$) particulates, wherein the liquid carrier is at least one of water or alcohol, and wherein the binder is at least one a polymeric adhesive or a polyvinyl acetate;
generating a pressure gradient, via a pump, causing the slurry to flow in an in-plane direction through the fibrous preform from an outside diameter of the fibrous preform through and an inside diameter of the fibrous preform and into an interior of a filter coupled to the pump and located along the inside diameter of the fibrous preform; and
densifying the fibrous preform after infiltrating the fibrous preform.

6. The method of claim 5, wherein the locating the fibrous preform in the cavity comprises orienting the radial direction to be parallel with a vertical direction.

7. The method of claim 5, wherein the locating the fibrous preform in the cavity comprises orienting the radial direction to be perpendicular with a vertical direction.

8. The method of claim 2, wherein the fibrous preform has three dimensions with two of the dimensions being thicker than a third dimension, wherein the radial direction is parallel to the thicker two dimensions, and wherein the vertical direction of the cavity is parallel to the direction of gravity.

9. The method of claim 1, wherein the particulates have an average particulate size from sub-micron up to about 30 microns.

10. The method of claim 9, wherein the average particulate size is 3.8 microns.

11. The method of claim 5, wherein the particulates have an average particulate size from sub-micron up to about 30 microns.

12. The method of claim 11, wherein the average particulate size is 3.8 microns.

* * * * *